(12) United States Patent
Karst et al.

(10) Patent No.: US 11,272,659 B2
(45) Date of Patent: Mar. 15, 2022

(54) CONTROLLED OR TUNED FLOAT ON AN AGRICULTURAL HARVESTER TO MODIFY FLOAT RESPONSE

(71) Applicant: Deere & Company, Moline, IL (US)

(72) Inventors: Austin J. Karst, Ottumwa, IA (US);
David V. Rotole, Bloomfield, IA (US);
Tyler J. Bouslog, Ottumwa, IA (US)

(73) Assignee: Deere & Company, Moline, IL (US)

( * ) Notice: Subject to any disclaimer, the term of this patent is extended or adjusted under 35 U.S.C. 154(b) by 293 days.

(21) Appl. No.: 16/366,317

(22) Filed: Mar. 27, 2019

(65) Prior Publication Data
US 2020/0305348 A1 Oct. 1, 2020

(51) Int. Cl.
*A01D 41/127* (2006.01)
*A01D 41/06* (2006.01)
*A01D 41/14* (2006.01)

(52) U.S. Cl.
CPC ........... *A01D 41/127* (2013.01); *A01D 41/06* (2013.01); *A01D 41/145* (2013.01)

(58) Field of Classification Search
CPC .... A01D 41/127; A01D 41/06; A01D 41/145; A01D 411/127; A01D 411/145; A01D 41/141; A01D 67/00; A01D 69/03; A01B 63/008; A01B 63/108; A01B 63/10; A01B 63/1013; A01B 63/1006
See application file for complete search history.

(56) References Cited

U.S. PATENT DOCUMENTS

| | | | | |
|---|---|---|---|---|
| 3,509,701 A | * | 5/1970 | Clarke | A01D 41/145 56/208 |
| 3,953,959 A | * | 5/1976 | Decruyenaere | A01D 41/141 56/208 |
| 4,718,325 A | * | 1/1988 | Shore | E02F 3/384 414/694 |
| 4,733,523 A | * | 3/1988 | Dedeyne | A01D 75/287 56/10.2 E |
| 4,825,655 A | * | 5/1989 | Buchl | A01B 63/22 60/546 |
| 5,964,077 A | | 10/1999 | Guinn | |
| 5,992,146 A | * | 11/1999 | Hausman | E02F 9/2207 60/413 |
| 6,085,501 A | | 7/2000 | Walch et al. | |
| 6,220,289 B1 | | 4/2001 | Zenker et al. | |
| 6,263,977 B1 | | 7/2001 | Mayerle et al. | |
| 6,647,721 B2 | * | 11/2003 | Heyne | B60T 17/04 137/115.13 |

(Continued)

FOREIGN PATENT DOCUMENTS

| | | | | |
|---|---|---|---|---|
| EP | 1264989 A1 | * | 12/2002 | F15B 1/021 |
| FR | 2534771 A1 | * | 4/1984 | A01D 41/145 |

OTHER PUBLICATIONS

Non-Final Office Action for U.S. Appl. No. 16/392,120 dated May 5, 2021, 12 pages.

(Continued)

*Primary Examiner* — Alicia Torres
*Assistant Examiner* — Madeline I Runco
(74) *Attorney, Agent, or Firm* — Joseph R. Kelly; Kelly, Holt & Christenson PLLC (57) ABSTRACT

A float cylinder is coupled to an accumulator by a first hydraulic fluid conduit. The float cylinder and accumulator are coupled to apply a float force on a header main frame.

20 Claims, 10 Drawing Sheets

(56) References Cited

U.S. PATENT DOCUMENTS

| | | | |
|---|---|---|---|
| 6,675,568 B2 | 1/2004 | Patterson et al. | |
| 6,901,729 B1 | 6/2005 | Otto et al. | |
| 6,973,779 B2 * | 12/2005 | Naaktgeboren | A01B 63/32 60/328 |
| 7,168,226 B2 | 1/2007 | McLean et al. | |
| 7,261,030 B2 * | 8/2007 | Liberfarb | F15B 11/05 60/461 |
| 7,555,883 B2 | 7/2009 | Fackler et al. | |
| 7,647,755 B2 | 1/2010 | Barnett et al. | |
| 7,661,251 B1 | 2/2010 | Sloan et al. | |
| 7,703,266 B2 | 4/2010 | Fackler et al. | |
| 7,707,811 B1 | 5/2010 | Strosser | |
| 7,793,740 B2 * | 9/2010 | Thomson | E02F 9/2217 172/795 |
| 7,861,506 B2 * | 1/2011 | Humbert | A01D 89/008 56/341 |
| 7,869,922 B2 | 1/2011 | Otto et al. | |
| 8,001,751 B2 | 8/2011 | Ehrhart et al. | |
| 8,401,745 B2 | 3/2013 | Otto et al. | |
| 8,572,938 B2 | 11/2013 | Deneault et al. | |
| 9,043,955 B2 | 6/2015 | Nafziger et al. | |
| 9,681,601 B2 * | 6/2017 | Bassett | A01B 63/111 |
| 9,717,180 B2 | 8/2017 | Teach et al. | |
| 9,968,033 B2 | 5/2018 | Dunn et al. | |
| 2001/0002533 A1 | 6/2001 | Rhody et al. | |
| 2003/0074876 A1 | 4/2003 | Patterson et al. | |
| 2006/0150604 A1 | 7/2006 | Kieffer et al. | |
| 2014/0360174 A1 | 12/2014 | Sohn | |
| 2014/0373519 A1 | 12/2014 | Franzoni et al. | |
| 2016/0037721 A1 | 2/2016 | Teach et al. | |
| 2016/0316624 A1 | 11/2016 | Ritter et al. | |
| 2017/0191506 A1 | 7/2017 | Lacher et al. | |
| 2017/0215329 A1 | 8/2017 | Lacher et al. | |
| 2017/0261009 A1 | 9/2017 | Paulessen et al. | |
| 2017/0359955 A1 | 12/2017 | Dunn et al. | |
| 2018/0153101 A1 | 6/2018 | Dunn et al. | |
| 2018/0153102 A1 | 6/2018 | Dunn et al. | |
| 2018/0180068 A1 | 6/2018 | Fukuda et al. | |
| 2018/0359920 A1 | 12/2018 | Dunn et al. | |
| 2019/0110404 A1 | 4/2019 | Vandeven et al. | |
| 2019/0191615 A1 | 6/2019 | Thompson | |
| 2019/0200523 A1 | 7/2019 | Fay, II et al. | |
| 2020/0077585 A1 | 3/2020 | Garbald et al. | |
| 2020/0337239 A1 | 10/2020 | Brimeyer et al. | |
| 2020/0337240 A1 | 10/2020 | Brimeyer et al. | |
| 2020/0344851 A1 | 11/2020 | Vandeven et al. | |
| 2021/0063265 A1 | 3/2021 | Smith et al. | |

OTHER PUBLICATIONS

Non-Final Office Action for U.S. Appl. No. 16/392,156 dated May 13, 2021, 15 pages.

Application and Drawings for U.S. Appl. No. 16/392,082, filed Apr. 19, 2019, 31 pages.

Application and Drawings for U.S. Appl. No. 16/392,120, dated Apr. 23, 2019, 28 pages.

Application and Drawings for U.S. Appl. No. 16/392,156, dated Apr. 23, 2019, 35 pages.

Non-Final Office Action for U.S. Appl. No. 16/392,082 dated Apr. 15, 2021, 16 pages.

Notice of Allowance received for U.S. Appl. No. 16/392,156 dated Aug. 10, 2021, 5 pages.

Notice of Allowance received for U.S. Appl. No. 16/392,082 dated Sep. 10, 2021, 6 pages.

Notice of Allowance received for U.S. Appl. No. 16/392,120 dated Sep. 10, 2021, 5 pages.

* cited by examiner

CONTROLLED OR TUNED FLOAT ON AN AGRICULTURAL HARVESTER TO MODIFY FLOAT RESPONSE

FIELD OF THE DESCRIPTION

This description relates to agricultural equipment. More specifically, the present description relates to a system for applying float pressure on the header of an agricultural harvester.

BACKGROUND

There is a wide variety of different types of agricultural equipment. Some such equipment includes agricultural harvesters.

It is common for agricultural harvesters (such as combine harvesters, forage harvesters, windrowers, etc.) to have a header. On a combine, the header is attached to a feeder house by an attachment frame. The header has a main frame that supports a cutter bar and a reel. The main frame is movable relative to the attachment frame. As the harvester travels, the header engages crop, severs it and transfers the crop into the harvester for further processing.

On a windrower, the header has a main frame and a cutter that are movably attached to a traction unit. A lift cylinder is actuated to raise and lower the main frame and cutter relative to the traction unit, and thus relative to the ground. The main frame can also be pivotally attached so that it can be tilted, using a tilt actuator, such as a tilt cylinder.

In such machines, it is common for the header to be set a given distance above the ground. Also, it is believed that improved harvesting performance can be achieved when the header generally follows the surface of the ground, so that it maintains roughly the same distance above the ground throughout the harvesting operation.

In order to achieve better ground following performance, some harvesters are configured with a float assembly that applies a float force to the header. The float force is a lifting force oriented to maintain the header at the given distance above the ground. The header often has ground engaging elements which provide a ground reference input to the header. Therefore, if the ground underneath the header falls, the header is normally weighted sufficiently to overcome the float force so the main frame drops to follow the ground downward. If the ground under the header rises, then the ground engaging elements act to aid the float force in lifting the header (e.g., lifting the main frame) to follow the ground upward.

It is also not uncommon for there to be obstacles (such as dirt, root balls, rocks, or other obstacles) in the path of the harvester. When the header (or the ground engaging elements) contact an obstacle, this can impart a lifting force (or pulse) on the header as well. The float force allows the header to respond to the upwardly directed force, by rising up, and then settling back to its original position relative to the ground.

It can thus be seen that if the float force is set too low, then the header will respond to the ground or an obstacle more slowly, which can result in the cutter on the header digging into the ground or being damaged by the obstacle. However, if the float force is set too high, then the header will not fall fast enough after striking an obstacle, or when the ground falls away, to follow the ground, which results in missed crop, and poor harvesting performance.

The discussion above is merely provided for general background information and is not intended to be used as an aid in determining the scope of the claimed subject matter.

SUMMARY

A float cylinder is coupled to an accumulator by a first hydraulic fluid conduit. The float cylinder and accumulator are coupled to apply a float force to a header. A flow restrictor is placed in the first hydraulic fluid conduit to restrict flow when a lifting force is imparted to the header.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Harvester headers have a main frame that supports the header structure. The main frame is movable relative to a traction unit (such as a combine harvester or windrower traction unit) by a positioning actuator so the header can be positioned at a desired height relative to the ground. The main frame is also movable relative to the traction unit in order to float above the ground (and sometimes in order to set a tilt angle of the header as well). Float mechanisms are sometimes positioned to provide a lifting force to the main frame relative to the traction unit. This allows the header to respond to changing ground levels and to contact with obstacles to better follow the ground.

In the past, a float cylinder has been hydraulically coupled to an accumulator. The accumulator provides hydraulic fluid under pressure to the float cylinder, which, in turn, provides the lifting force. When an upwardly directed force is imparted on the header (such as when the header, or a ground engaging element of the header, strikes an obstacle on the ground) the header rises, assisted by the float force, and the float cylinder draws hydraulic fluid out of the accumulator. The header then falls back to its original position, because the weight of the header overcomes the upwardly directed float force (e.g., pressure in the accumulator). Currently, it is not uncommon for the hydraulic circuit to allow hydraulic fluid to freely flow through a hydraulic conduit between the float cylinder and the accumulator. This can present difficulties.

For instance, when a ground engaging element on the header (or another part of the header) hits an obstacle that imparts a relatively sever upwardly directed force on the header, the header can rise to an undesirably high level, and then fall back to its ground following position, overcoming the lifting force applied by the float cylinder, at a relatively slow rate. This causes the header to perform relatively poorly in ground following. This can cause the header to miss crop, or it can cause an uneven cut.

Thus, the present description proceeds with respect to a tuned or controllable flow restrictor disposed in the tube defining the hydraulic fluid conduit that connects the float cylinder to the accumulator. This is just one example, as it could be disposed in an external valve block, or elsewhere in the circuit, to restrict flow between the float cylinder and the accumulator. This helps to control the flow of hydraulic fluid between the two, and thus to control the float response, to improve ground following.

Figure 1:
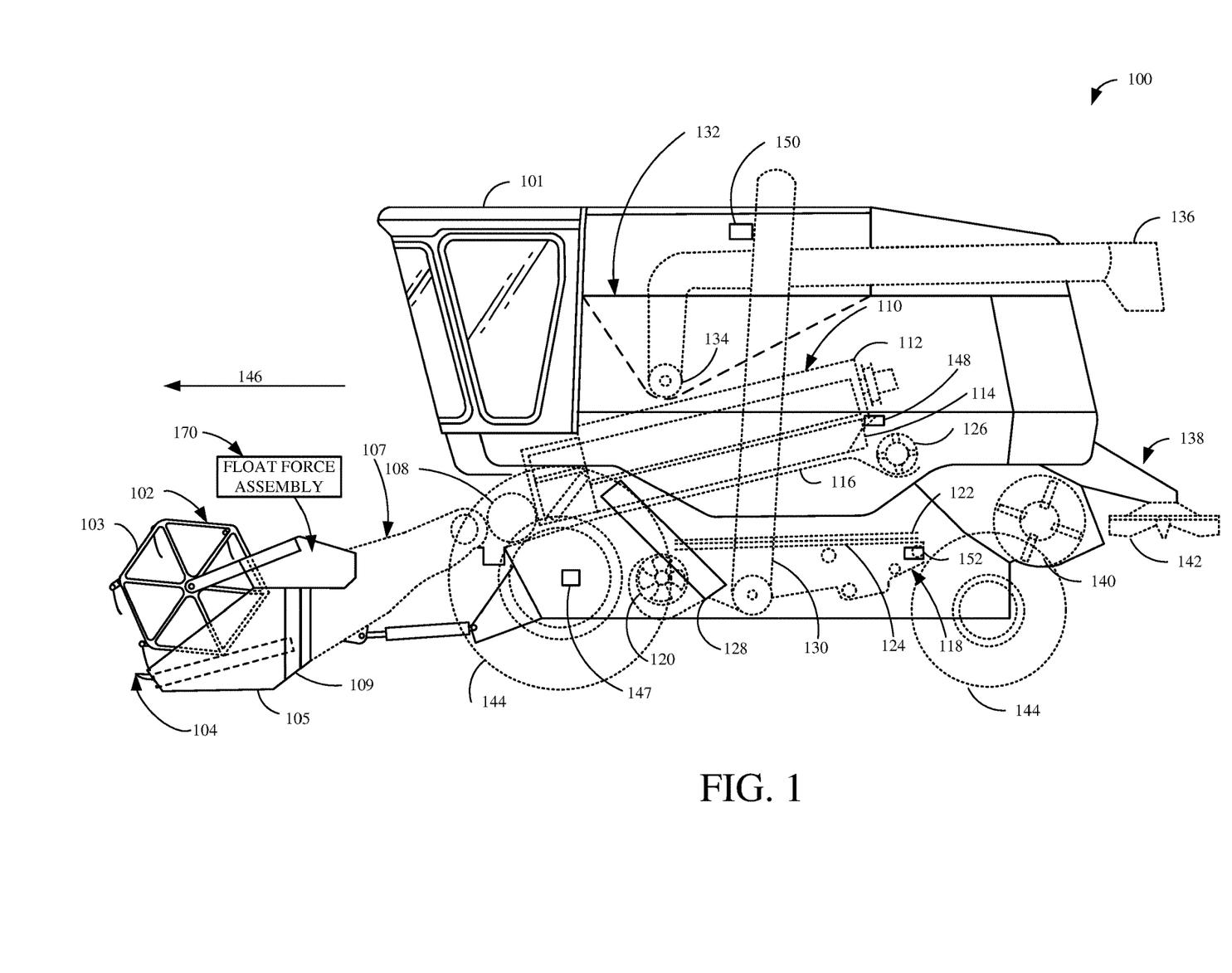
FIG. 1 is a partial pictorial, partial schematic view of a combine harvester.

FIG. 1 is a partial pictorial, partial schematic, illustration of an agricultural machine 100, in an example where machine 100 is a combine harvester (also referred to as combine 100 or machine 100). It can be seen in FIG. 1 that combine 100 illustratively includes an operator compartment 101, which can have a variety of different operator interface mechanisms, for controlling combine 100. Combine 100 can include a set of front end equipment that can include header 102, and a cutter generally indicated at 104. It can also include a feeder house 107, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 107 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine (or other power source) that drives ground engaging wheels 144 or tracks, etc. It will be noted that combine 100 may also have more than one of any of the subsystems mentioned above (such as left and right cleaning shoes, separators, etc.).

Header 102 has a main frame 105 and an attachment frame 109. Header 102 is attached to feeder house 107 by an attachment mechanism on attachment frame 109 that cooperates with an attachment mechanism on feeder house 107. Main frame 105 supports cutter 104 and reel 103 and is movable relative to attachment frame 109. In one example, main frame 105 and attachment frame 109 can be raised and lowered together to set a height of cutter 104 above the ground over which combine 100 is traveling. In another example, main frame 105 can be tilted relative to attachment frame 109 to adjust a tilt angle with which cutter 104 engages the crop. Also, in one example, main frame 105 can be rotated or otherwise movable relative to attachment frame 109 in order to improve ground following performance. The movement of main frame 105 together with attachment frame 109 can be driven by actuators (such as hydraulic actuators) based on operator inputs or automated inputs.

In operation, and by way of overview, the height of header 102 is set and combine 100 illustratively moves through a field in the direction indicated by arrow 146. As it moves, header 102 engages the crop to be harvested and gathers it toward cutter 104. After it is cut, the crop can be engaged by reel 103 that moves the crop to feeding tracks 154, 156 (shown in FIG. 2). Feeding tracks move the crop to the center of the header 102 and then through a center feeding track in feeder house 107 toward feed accelerator 108, which accelerates the crop into thresher 110. The crop is threshed by rotor 112 rotating the crop against concaves 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

In one example, combine 100 has a tailings system where tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152. Ground speed sensor 147 illustratively senses the travel speed of combine 100 over the ground. This can be done by sensing the speed of rotation of the wheels, the drive shaft, the axle, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

As combine 100 moves in the direction indicated by arrow 146, it may be that the ground under header 102 contains obstacles or is uneven. Header 102 is thus provided with ground engaging elements (such as shoes or gauge wheels) that engage the surface of the ground over which combine 100 is traveling. Combine 100 is also provided with float force assembly 170. Float force assembly 170 is shown schematically in FIG. 1, and applies a float force, that is illustratively a lifting force that acts against gravity, biasing main frame 105 of header 102 in an upward direction relative to attachment frame 109. Therefore, as the ground under header 102 rises, the ground engaging elements on header 102 engage the rising ground surface and push upwardly on main frame 105. The float force applied by float force assembly 170 assists in raising header 102 up to follow the rising ground surface. In areas where the ground falls off, the weight of header 102 overcomes the float force so that it descends to its ground following set point or to a point where the ground engaging elements again engage the surface of the ground.

Similarly, if header 102, or one of the ground engaging elements on header 102, engage an obstacle (such as by striking a stone, a clump of dirt, a root ball, etc.), this impact may impart an upwardly directed force on header 102 as well. This upwardly directed force will be relatively sharp and of short duration (or pulsed). Again, as when the ground rises under header 102, the float force applied by float force assembly 170 assists in raising header 102 up, in response to the upwardly directed force imparted by the impact with the obstacle. This acts to absorb some of the impact and allow the header 102 to rise above the obstacle. The weight of the header 102 then causes it to act against the float force and return to its ground following position.

Figure 2:
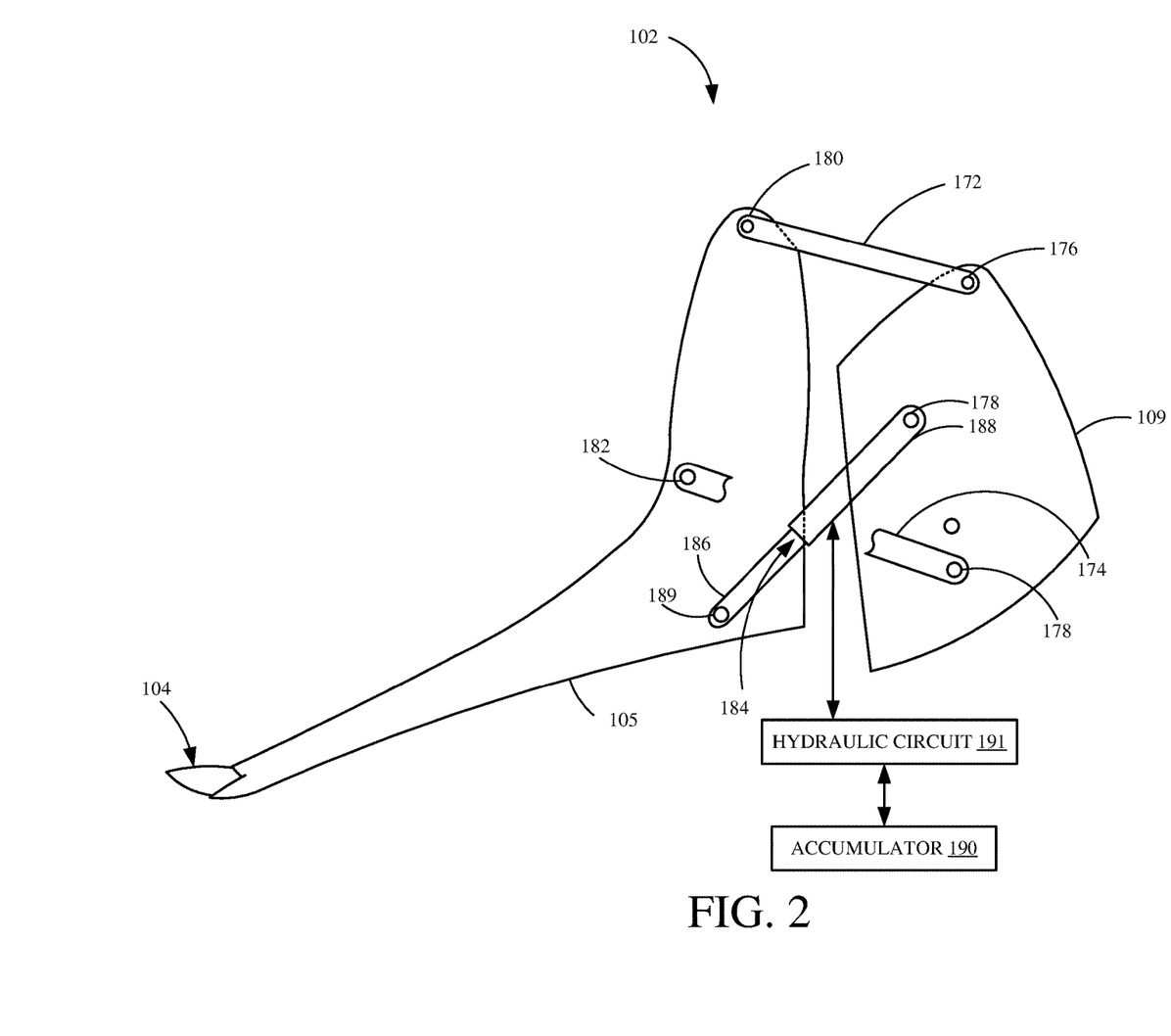
FIG. 2 shows a float force assembly with an attachment frame and main frame in a first position relative to one another.

FIG. 2 shows one example of a portion of header 102 with a float force assembly 170, that applies a float force, to header 102. In the example shown in FIG. 2, some elements are similar to those shown in FIG. 1, and they are similarly numbered.

FIG. 2 shows that main frame 105, which supports cutter 104 and reel 103 (not shown in FIG. 2) is at a first position relative to attachment frame 109. Attachment frame 109 illustratively includes an attachment mechanism (not shown) that attaches to a corresponding attachment mechanism on feeder house 107. The vertical movement of main frame 105 relative to attachment frame 109 is illustratively driven by ground engaging elements, such as gauge wheels, shoes or skis (not shown) which act to raise and lower main frame 105 relative to attachment frame 109 as the ground over which the ground engaging elements move rises and falls, respectively. As mentioned above, vertical movement can also be driven by the impact of one of the ground engaging elements or the header 102 with an obstacle. In another example, main frame 105 can also be tilted relative to attachment frame 109 by a tilt actuator (also not shown).

In the example illustrated in FIG. 2, a set of control arms 172 and 174 are pivotally connected to attachment frame 109 at pivot points 176 and 178, and are pivotally attached to main frame 105 at pivot points 180 and 182, respectively. Control arms 172 and 174 control the path of movement of main frame 105 relative to attachment frame 109 when the position of main frame 105 relative to attachment frame 109 changes to follow the ground. This is just one example of an arrangement for controlling the path of movement.

Float force assembly 170 illustratively includes cylinder 184 that is pivotally connected to attachment frame 109 at pivot point 187, and that is pivotally attached to main frame 105 at pivot point 189. Hydraulic cylinder 184 has a rod portion 186 reciprocally mounted within cylinder portion 188. Assembly 170 also illustratively includes an accumulator 190. Accumulator 190 is shown schematically in FIG. 2 and is shown attached to cylinder 184, through a hydraulic fluid conduit and hydraulic circuit 191. It will be appreciated that, in one example, it can be internal to hydraulic cylinder 184. In another example, accumulator 190 and circuit 191 can be separate from hydraulic cylinder 184 and fluidically coupled to hydraulic cylinder 184. In one example, there are at least two float force assemblies 170, disposed in spaced relation to one another across the header 102. This is just an example.

Accumulator 190 can take a wide variety of different forms. For instance, the accumulator 190 can include a diaphragm or other pressure transmitting mechanism. The diaphragm can have one side in fluid communication with the rod end of cylinder 104 and has a compressible fluid or a compressible gas disposed on its other side. When rod 186 is extended further out cylinder portion 188, the pressure increases in the rod end of cylinder 184, and the diaphragm compresses the compressible medium in accumulator 190, thus increasing the pressure in accumulator 190. When rod 186 is further retracted into of cylinder portion 188, then the pressure in the base end of cylinder 184 is reduced, and the compressible medium expands, pushing against the diaphragm (or other movable member) so that the pressure in accumulator 190 is reduced and hydraulic fluid is drawn from the accumulator 190 into the rod end of the cylinder.

Figure 3:
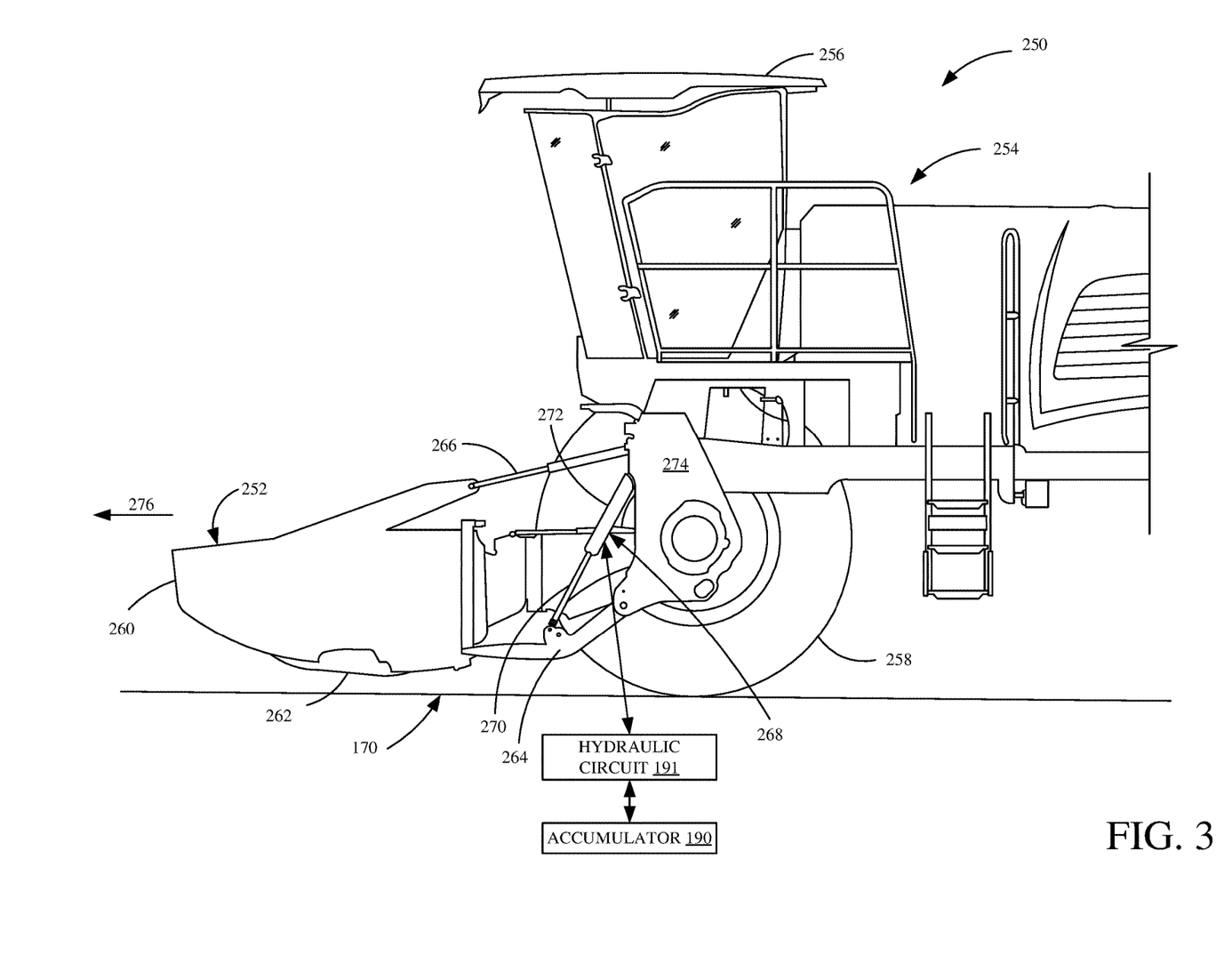
FIG. 3 is a partial schematic, partial pictorial illustration of a windrower.

FIG. 3 is a partial pictorial, partial schematic illustration of a portion of a mobile machine 250, in which mobile machine 250 is an agricultural windrower. In the example shown in FIG. 3, machine 250 has a header 252 that is coupled to, and supported by, a traction unit 254. Traction unit 254 has an operator compartment 256 and an engine or other power source that drives movement of ground engaging elements (e.g., wheels) 258. The power source can also include a hydraulic system (or other power system) that provides power to functionality for header 252.

Header 252 illustratively includes a header main frame 260 that supports cutter 262. The header main frame 260 is supported for movement, relative to traction unit 254, by lift arm 264. Lift arm 264 can be moved (e.g., lifted and lowered, relative to traction unit 254) by actuating a lift cylinder (or a set of lift cylinders), not shown in FIG. 3. In addition, header 252 can be tilted by actuating tilt cylinder 266.

FIG. 3 also shows that float cylinder 268 (or a set of float cylinders) are coupled between the main frame of 260 of header 252 and the traction unit 254 to exert a lifting force on the header 252 relative to traction unit 254. In the example shown in FIG. 3, float cylinder 268 has its rod end 270 coupled to lift arm 264 and its base end 272 coupled to a frame 274 of traction unit 254. Also, as with the float assembly 170 shown in FIG. 2, float cylinder 268 is also coupled to accumulator 190 through hydraulic circuit 191.

In operation, an operator sets header 252 to a desired height so that cutter 262 engages crop to be cut. As machine 250 movers generally in the direction indicated by arrow 276, cutter 262 engages and cuts the crop. The cut crop is gathered centrally within main frame 260 and dropped in a windrow at the exit end of header 252.

Accumulator 190 illustratively provides hydraulic fluid under pressure to the rod end of float cylinder 268 to exert the lifting force on header 252. When there is an upwardly directed force imparted on header 252 (such as when it hits an obstacle), then the rod of cylinder 268 retracts into the base end thus drawing fluid from accumulator 190, through hydraulic circuit 191, as header 252 moves upwardly in response to the imparted force. When header 252 begins to descend to its original position (its position before the upwardly directed force was imparted), cylinder 268 forces hydraulic fluid from its rod end, back into accumulator 190, through hydraulic circuit 191.

Figure 4:
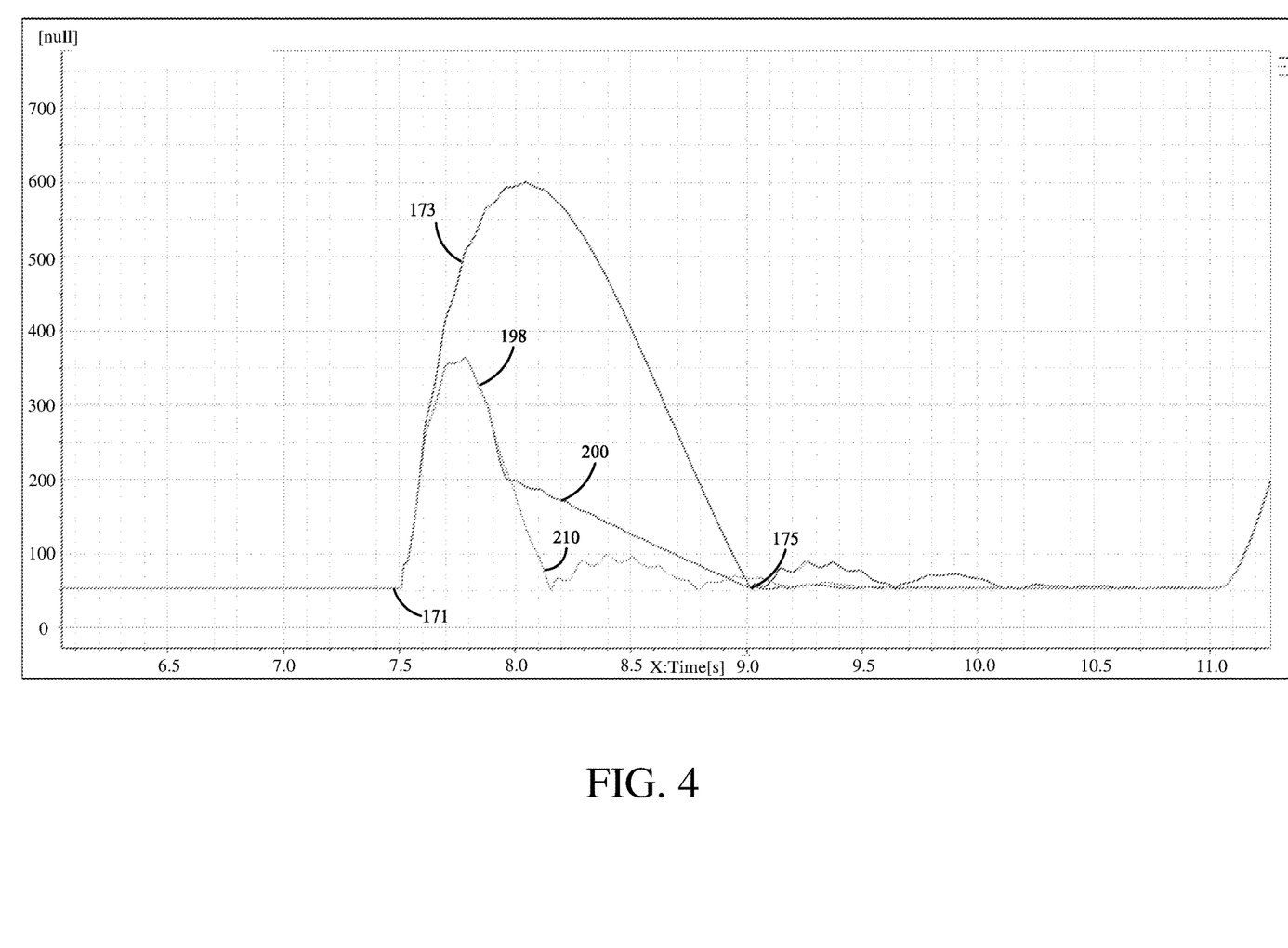
FIG. 4 is a graph showing float force assembly responses to an impact with an obstacle.

FIG. 4 shows a graph graphing the position of the tip of cutter 104 or 262 relative to the ground (along the y axis) against time (along the x axis). It is assumed at point 171 on the graph, the header impacts an obstacle, as the machine is moving along the field. This impact imparts an upwardly directed force on header 102/252. Thus, at point 171, the position of the tip of cutter 104/262 relative to the ground surface begins to rise, as indicated by graphical element 173. It rises to a height, based upon the magnitude of the impact, and then begins to fall back to its original ground following position, which it resumes roughly at point 175 on the graph. It can thus be seen that, in response to an impact, the header 102/252 can rise to a relatively great height above the ground, and it can take a relatively long amount of time in order to fall back to its ground following position. This can result in undesirable machine performance of harvesting and ground following.

Figure 5:
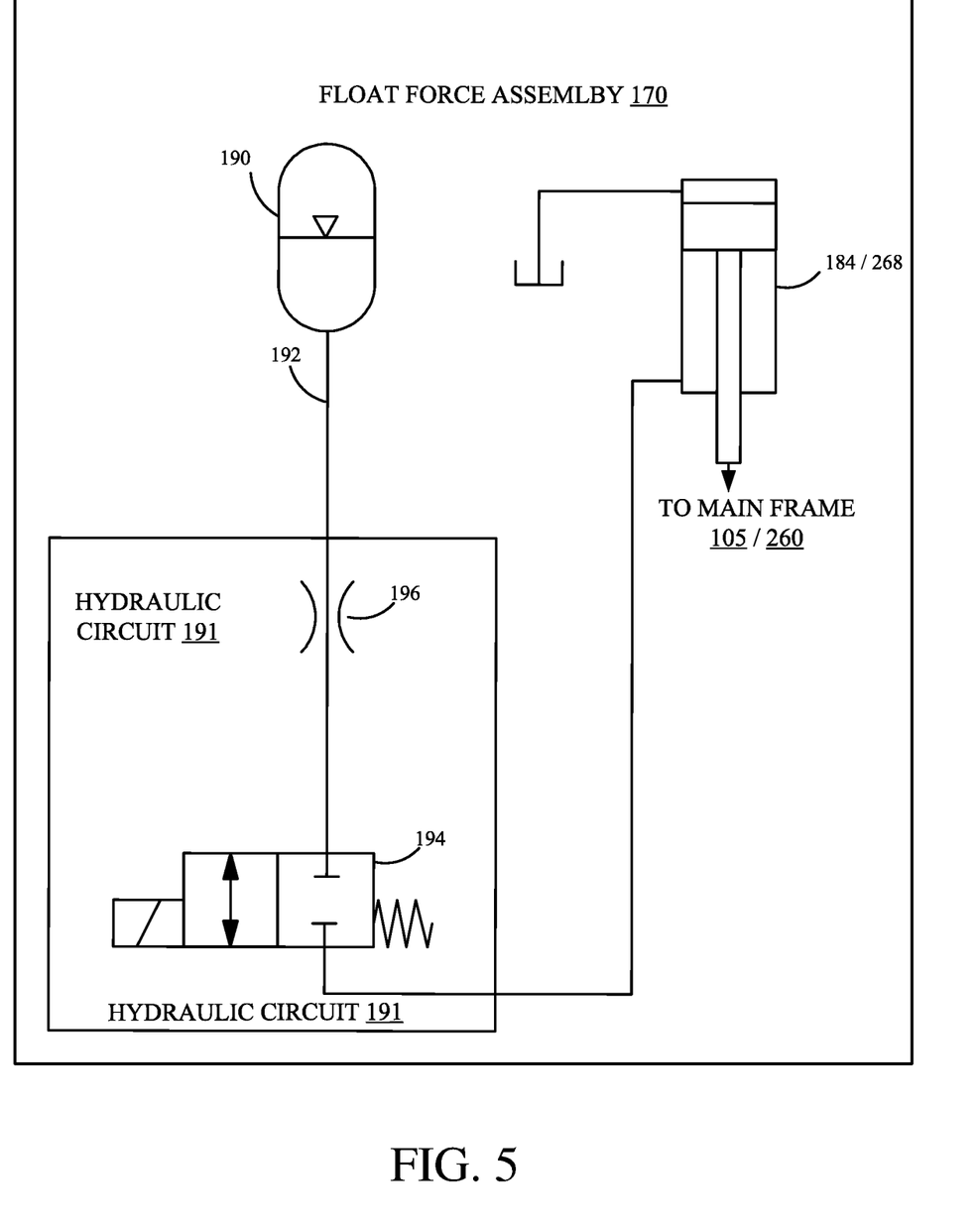
FIG. 5 is a hydraulic circuit diagram showing an orifice between the float cylinder and accumulator.

FIG. 5 is a hydraulic circuit diagram showing some portions of float force assembly illustrated in FIGS. 2 and 3. Some of the items shown in FIG. 5 are similar to those shown in FIGS. 1 and 2, and they are similarly numbered. For instance, the float cylinder can be cylinder 184 in the example shown in FIG. 2 or cylinder 268 in the example shown in FIG. 3. Therefore, it will be referred to as cylinder 184/268. FIG. 5 shows that accumulator 190 is hydraulically coupled through a hydraulic fluid conduit defined by tube 192 (the tube and defined conduit may be referred to hereafter as conduit 192) and a control valve 194 to float cylinder 184/268. The rod end of float cylinder 184/268 is connected to header main frame 105/260 (in a way such as that shown in FIG. 2 or FIG. 3 above). The rod end of the cylinder 184/268 is hydraulically coupled to accumulator 190, and the base end of cylinder 184/268 can be hydraulically coupled to the tank in the hydraulic system. During operation, valve 194 is in the opposite position to that shown in FIG. 5, so that hydraulic fluid can pass through valve 194.

In the example shown in FIG. 5, when header 102/252 receives an impact from an obstacle, there will be an upwardly directed force imparted on the rod of cylinder 184/268. This will cause rod 186 to move upwardly, retracting into cylinder 184, and thus drawing hydraulic fluid from accumulator 190.

FIG. 5 shows that hydraulic circuit 191 includes a fixed orifice 196. Fixed orifice 196 has an orifice opening that is smaller than the conduit defined by tube 192, on either side of the orifice 196. Therefore, orifice 196 illustratively restricts the flow of hydraulic fluid through conduit 192 by a fixed amount. This has the effect of damping out the response of float cylinder 184/268 to pulse-type forces imparted by impact with obstacles for example.

Referring again to FIG. 4, for instance, graphical element 198 shows the response of the hydraulic circuit shown in FIG. 5 to an impact at point 171. It can be seen that orifice 196 reduces the height that header 102/252 will reach after hitting an obstacle. Because the header does not reach so great a height, the ground following performance is improved.

It will be noted that orifice 196 can be tuned to achieve different effects. That is, its physical size and restrictive properties can be selected to achieve a desired performance. If the orifice is larger (with less flow restriction) then the profile illustrated in FIG. 4 will have a higher height in response to a bump impact. This may tend to absorb more of the impact. On the other hand, if it is smaller, and more restrictive, then the height of the header in response to a bump impact will be lower, and this will improve ground following performance.

A number of things should be noted with respect to the fixed orifice 196 and hydraulic circuit 191 (shown in FIG. 5). In one example, because orifice 196 is a fixed orifice, it restricts the flow of hydraulic fluid through hydraulic conduit 192 in both directions (both when the header 102/252 is ascending and descending). Therefore, in one example, the float response has a tail shown generally at 200 in FIG. 4. This means that the header will not achieve its set height, after receiving a bump impact, for some relatively extended time, because the pressure will not equalize between accumulator 190 and float cylinder 184/268 as quickly (due to the restriction of the fixed orifice 196). In addition, hydraulic circuit 191 may be plumbed so that when the operator wishes to raise header 102/252, the lifting actuator that is raising header 102/252 may need to push hydraulic fluid through orifice 196. This would tend to decrease the response of the header when it is being raised, based on an operator input.

When it is manually controlled, an operator 205 can use a suitable mechanism to control orifice 202. In an example when it is controlled by a control signal generated by control system 204, float force assembly 170 is provided with a variable orifice 202, such as that shown in FIG. 6. The other items in float force assembly 170 can be the same as those shown in FIG. 5, and they are similarly numbered in FIG. 6. The flow restriction provided by variable orifice 202 can be controlled by a control signal provided by a control system 204. Therefore, in one example, control system 204 can detect operator inputs 206 that are provided by operator 205 through operator interface mechanism(s) 207. Control system 204 can also detect sensor inputs 208 that are provided from one or more various sensors 209. Control system 204 can receive other inputs 211 as well. Control system 204 can then control the restrictive properties of variable orifice 202, based on one or more of those inputs. This can be done in a wide variety of different ways, and a number of examples will now be described.

Figure 6:
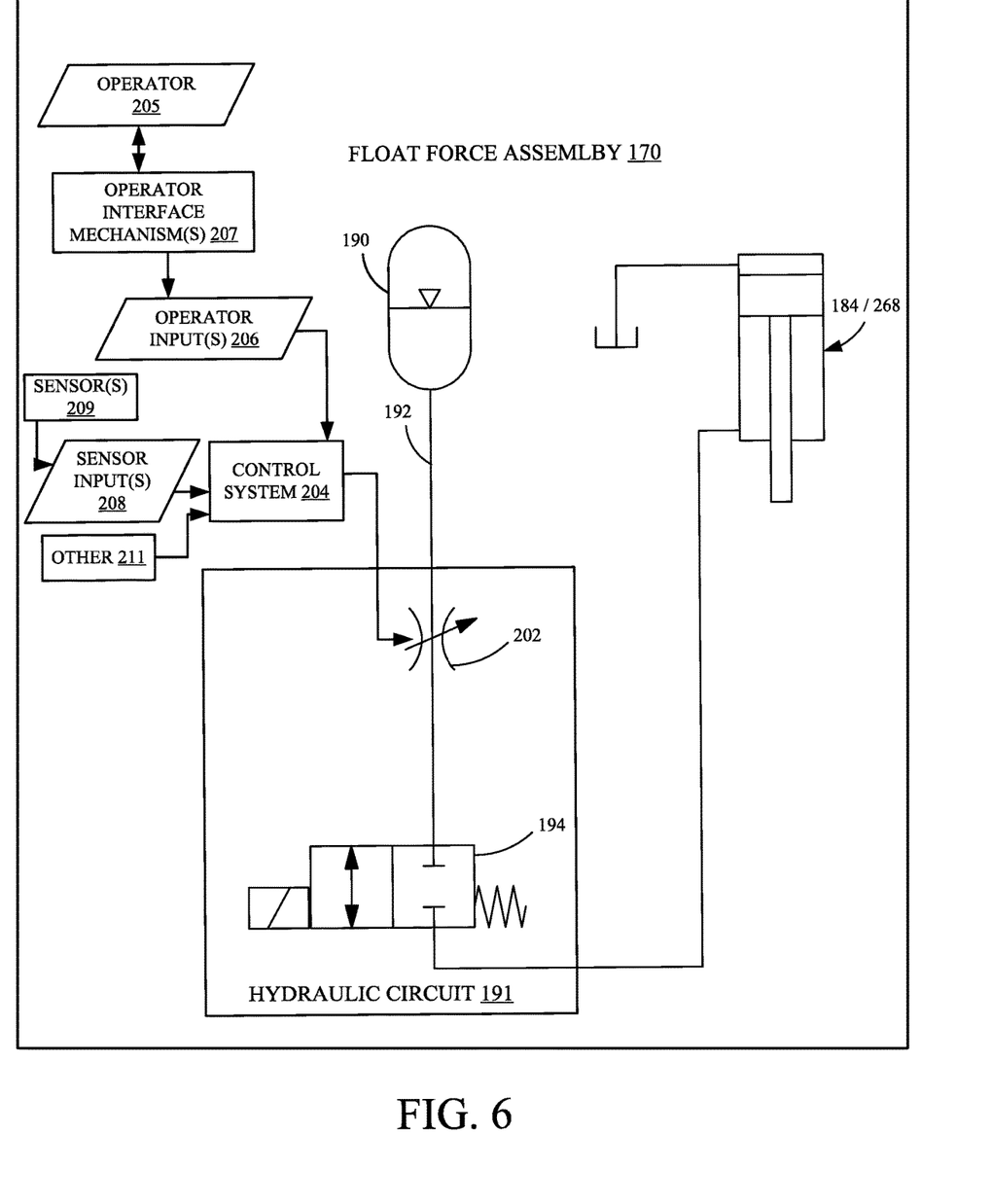
FIG. 6 is a hydraulic circuit diagram showing a variable orifice between the float cylinder and the accumulator.

In one example, when the operator is providing an input to raise header 102/252, control system 204 can detect that operator input and not only control the lift actuator that is lifting the header 102/252, but it can also control the variable orifice 202 to open it up so that it does not provide any restriction through conduit 192. In that way, the lift actuator that is raising the header need not fight against any restriction provided by orifice 202.

In another example, operator 205 may be provided with a float response tuning operator input mechanism 107. The operator 205 can actuate the mechanism 207 to change the responsiveness of the float force assembly 170 to be more or less responsive, as desired.

In addition, sensor inputs 208 can be provided by sensors that sense the position or direction of movement or other characteristics of header 102/252. When header 102/252 receives a bump impact, and begins to rise, this can be detected by the sensors 209 and provided as a sensor input 208 to control system 204. As the header continues to rise, control system 204 may control variable orifice 202 to provide a relatively high amount of flow restriction. However, once the header 102/252 reaches its maximum height, and again begins to descend toward the ground, control system 204 can again detect this through sensor inputs 208 and control variable orifice 202 to decrease the flow restriction, so that the header can fall more quickly back toward the ground and resume ground following operation.

This can be seen again with respect to graphical element 210 illustrated in FIG. 4. Because the variable orifice 202 is controlled to restrict flow, the orifice reduces the height that header 102/252 achieves after hitting an obstacle. However, because orifice 202 does not restrict flow when header 102 is descending, it allows for the header 102 to accelerate back towards the ground more quickly to improve float and ground following performance.

Control system 204 can also control variable orifice 202 based on a wide variety of other criteria. For instance, where a field has relatively rough terrain, it may control variable orifice 202 to provide a certain level of restriction whereas if the field has relatively smooth terrain, it may control variable orifice 202 to provide a different level of restriction. The orifice can be controlled based on crop type, soil conditions, operator inputs, or a wide variety of other criteria as well.

Figure 7:
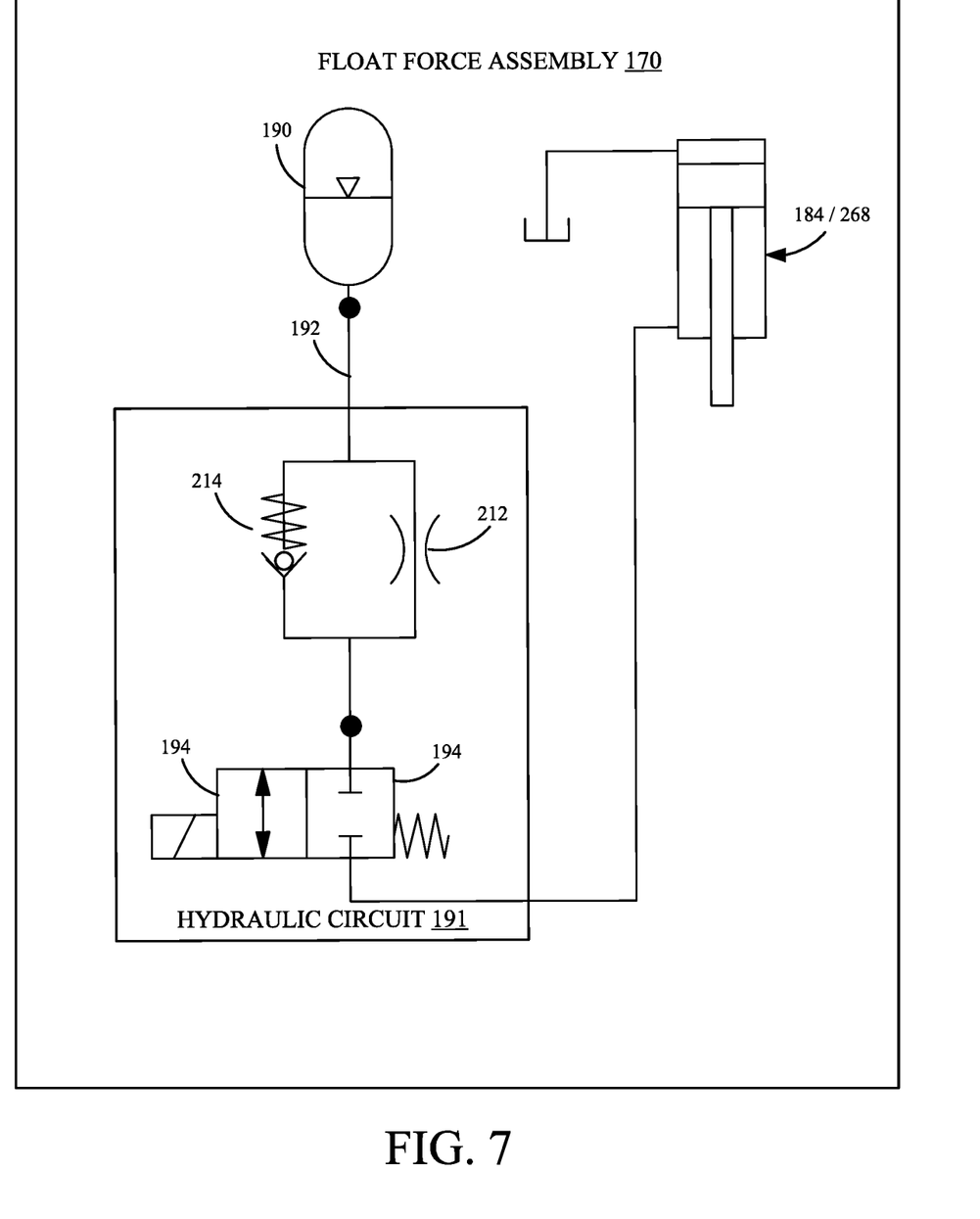
FIG. 7 is a hydraulic circuit diagram showing a fixed orifice with a one-way check valve disposed between the float cylinder and the accumulator.

Controlling or tuning float performance can be done in other ways as well. FIG. 7 shows another example of float force assembly 170. Some items in FIG. 7 are similar to those shown in FIG. 6, and they are similarly numbered. FIG. 7 shows that hydraulic circuit 191 now includes a fixed orifice 212 and a one-way check valve 214. When a bump impact is encountered by header 102, this will cause the rod to retract further into cylinder 184/268, thus drawing fluid from accumulator 190. When fluid is flowing through hydraulic conduit 192 in that direct (from accumulator 190 to float cylinder 184/268), the pressure drop across check valve 214 will keep it closed meaning that the flow must be provided through orifice 212. Thus, orifice 212 restricts flow to limit the height that header 102/252 will reach in response to a bump impact. However, when the header begins to fall again toward the ground, the rod will be extending further out of cylinder 184/268 and thus the flow will be in the opposite direction (from float cylinder 184/268 to accumulator 190). Thus, the pressure drop across check valve 214 will cause it to open so that the flow need not travel through orifice 212. In this way, header 102 can return more quickly to its ground following position after receiving a bump impact.

Figure 8:
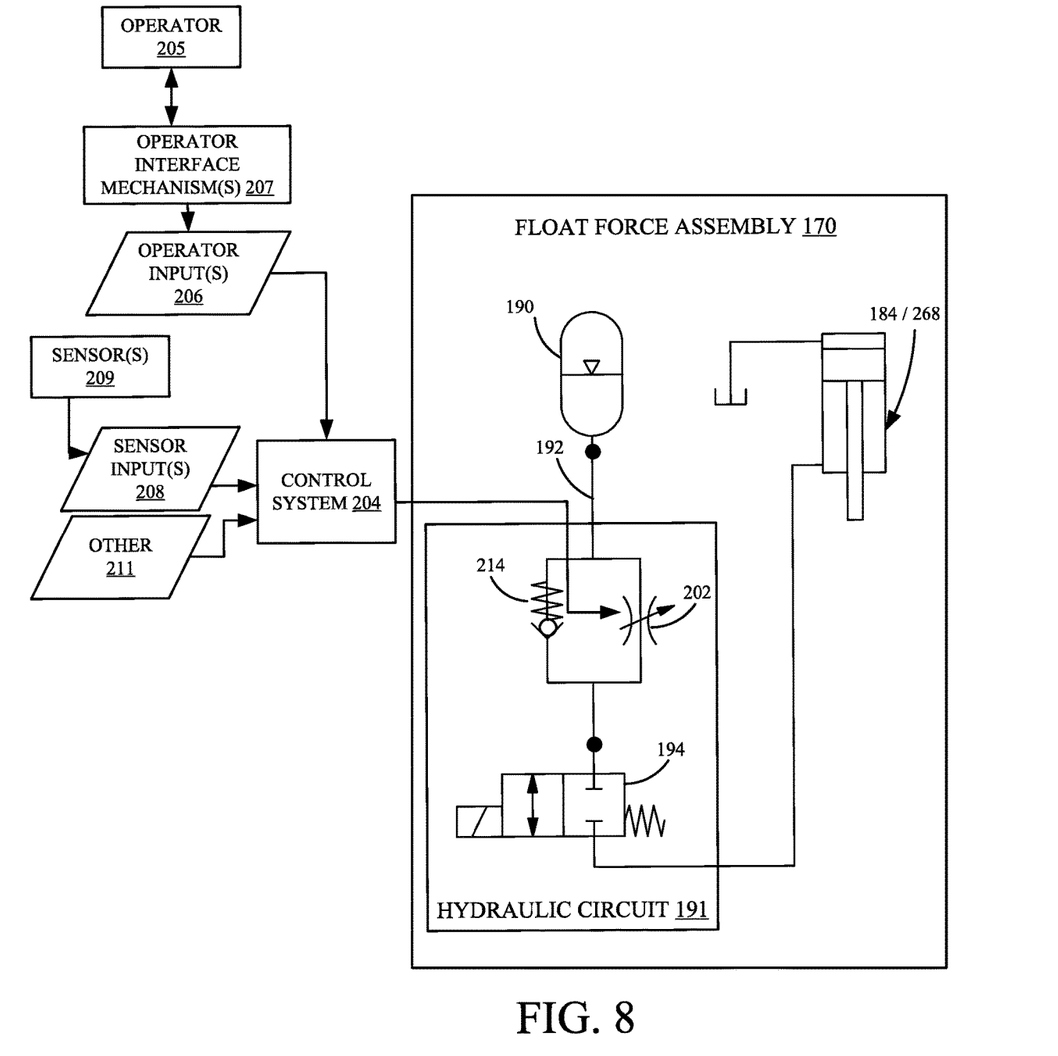
FIG. 8 is a hydraulic circuit diagram showing a variable orifice with a one-way check valve between the float cylinder and the accumulator.

FIG. 8 shows another example of float force assembly 170. Some items are similar to those shown in FIGS. 6 and 7, and they are similarly numbered. FIG. 8 shows that hydraulic circuit 191 not only includes variable orifice 202 (which may be similar to that, or different from that, described in FIG. 6) in parallel with one-way check valve 214. Therefore, the operation of hydraulic circuit 191 is similar to that described above with respect to FIG. 7, except that the orifice 202 that is in parallel with one-way check valve 214 is controllably variable. Therefore, control system 204 can control variable orifice 202 in the ways described above with respect to FIG. 6 or in other ways as well.

Figure 9:
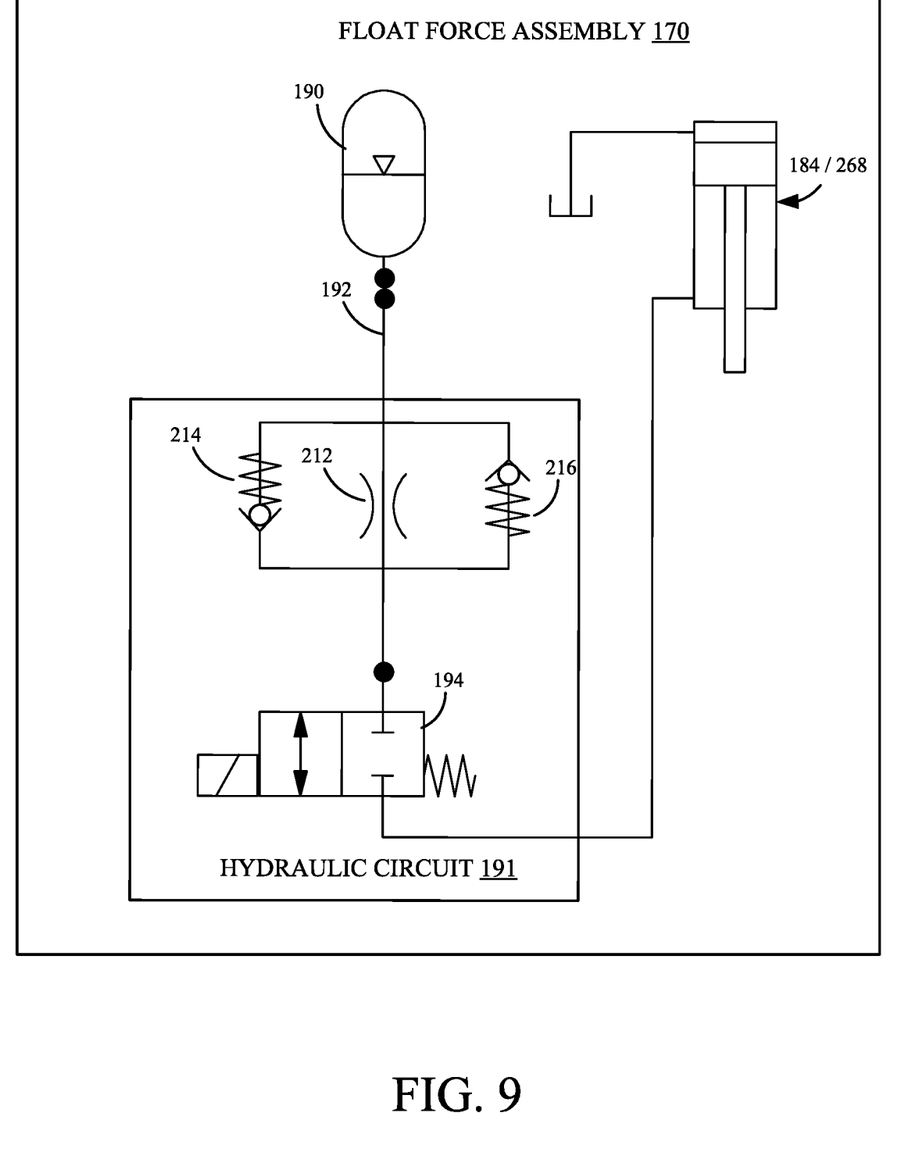
FIG. 9 is a hydraulic circuit diagram showing a fixed orifice with a one-way check valve and a load holding check valve disposed between the float cylinder and the accumulator.

FIG. 9 shows yet another example of a float force assembly 170. Some of the items are similar to those shown in FIG. 7, and they are similarly numbered. However, FIG. 9 shows that hydraulic circuit 191 also includes a second check valve 216 in parallel with both one-way check valve 214 and orifice 212. There may be instances where the header 102/252 receives a relatively severe bump impact so that the upwardly directed force on the rod of float cylinder 184/268 has a relatively high magnitude. This can cause the hydraulic system to be starved for fluid and may induce cavitation in the hydraulic circuit conduit leading into float cylinder 184/268. In order to avoid this, check valve 216 is provided. It may have a relatively high value open set point (such as 500 psi, or a set point that is significantly higher than that of check valve 214). In this way, hydraulic circuit 191 will operate in a similar fashion to that shown in FIG. 7 unless the pressure drop across orifice 212 reaches the set point of check valve 216, when fluid is flowing from accumulator 190 to float cylinder 184/268. When the pressure drop across orifice 212 reaches the set point of check valve 216, then flow from accumulator 190 to float cylinder 184/268 can jump across orifice 212 through check valve 216 to inhibit cavitation. Once the pressure has equalized to a value less than the set point of check valve 216, then check valve 216 again closes and orifice 212 and check valve 214 operate in the same way as described above with respect to FIG. 7.

Figure 10:
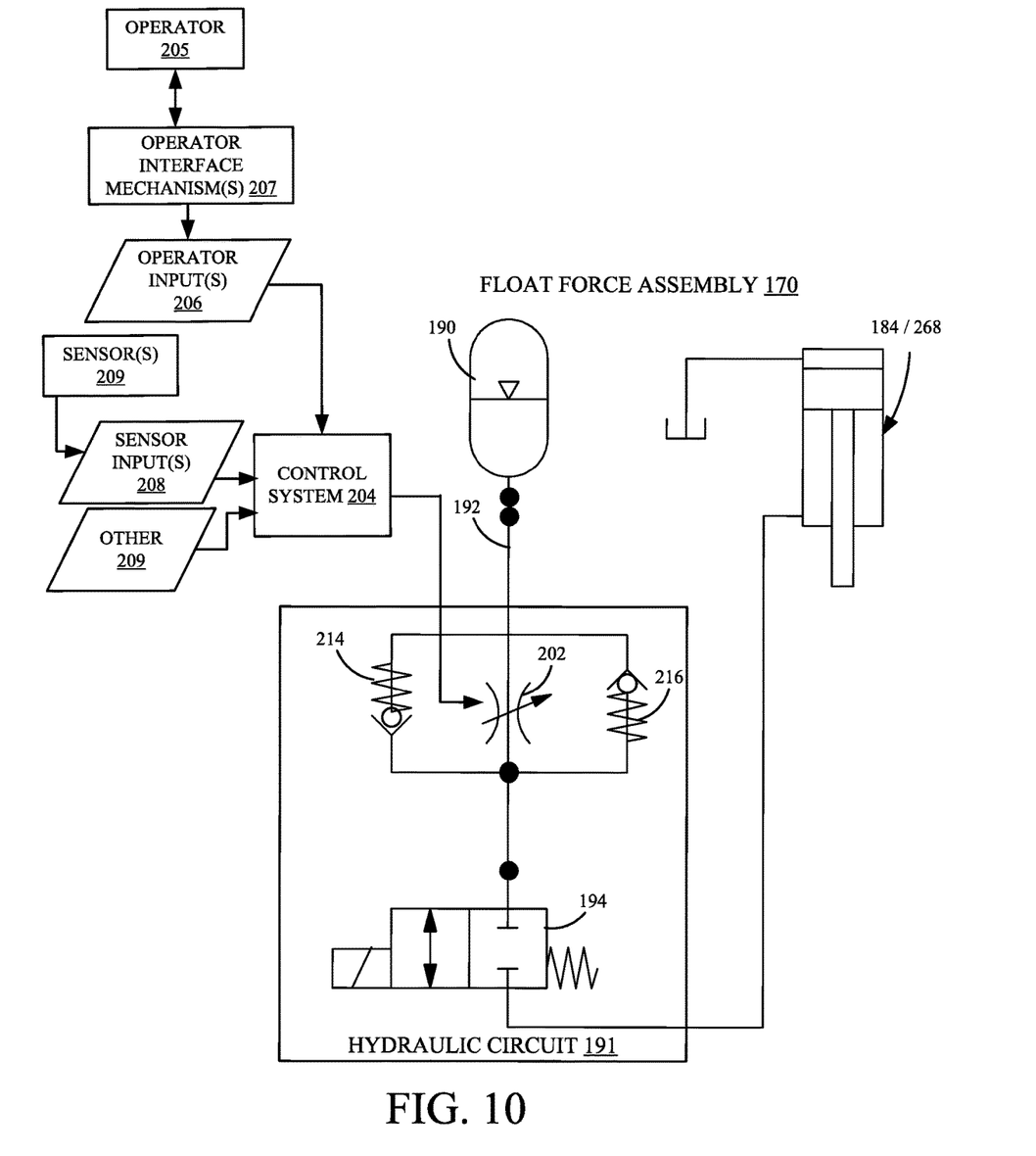
FIG. 10 is a hydraulic circuit diagram showing a variable orifice with a one-way check valve and a load holding check valve disposed between the float cylinder and the accumulator.

FIG. 10 shows yet another example of float force assembly 170. Some of the items in FIG. 10 are similar to those shown in FIGS. 8 and 9, and they are similarly numbered. However, FIG. 10 shows that hydraulic circuit 191 is similar to that shown in FIG. 9, except that instead of a fixed orifice 212, it has a variable orifice 202. Therefore, it operates in a similar fashion to that described above with respect to FIG. 7, except that the restrictive properties of orifice 202 can be controlled manually or by control system 204. Therefore, they can be controlled in the same way as described above with respect to FIGS. 6 and 8, or in different ways.

It can thus be seen that the float response of float force assembly 170 can be tuned, or it can be dynamically controlled. Both of these techniques allow for the header to absorb bump impacts by raising up, but they also allow the header to more quickly return to its ground following position. This improves the operation of the machine by not only improving ground following performance, but by thus improving harvesting performance as well.

Example 1 is a header assembly for an agricultural harvesting machine having a traction unit, comprising:

a cutter;

a main frame that supports the cutter;

a float cylinder configured to be coupled between the main frame and the traction unit;

an accumulator that is fluidically coupled to the float cylinder through a fluid conduit defined by a tube and that provides pressurized fluid under pressure to the float cylinder through the fluid conduit, so the float cylinder exerts a float force on the main frame; and a flow restricting orifice in the tube, between the float cylinder and the accumulator, that defines an orifice opening that is smaller than the fluid conduit on either side of the orifice.

Example 2 is the header assembly of any or all previous examples wherein the flow restricting orifice comprises:

a controllably variable orifice that has a variable orifice opening.

Example 3 is the header assembly of any or all previous examples and further comprising:

a first one-way check valve, disposed in parallel with the controllably variable orifice, that is configured to permit flow of the hydraulic fluid, through the first one-way check valve, from the float cylinder to the accumulator, when a pressure drop across the first one-way check valve reaches a first valve open set-point and to inhibit flow of the hydraulic fluid, through the first one-way check valve, from the accumulator to the float cylinder, when the pressure drop across the first one-way check valve drops below the first valve open set-point.

Example 4 is the header assembly of any or all previous examples and further comprising:

a second one-way check valve, disposed in parallel with the controllably variable orifice and the first one-way check valve, that is configured to permit flow of the hydraulic fluid, through the second one-way check valve, from the accumulator to the float cylinder, when a pressure drop across the second one-way check valve reaches a second valve open set-point and to inhibit flow of the hydraulic fluid, through the second one-way check valve, from the float cylinder to the accumulator, when the pressure drop across the second one-way check valve drops below the second valve open set-point.

Example 5 is the header assembly of any or all previous examples wherein the second one-way check valve is configured so the second valve open setpoint is higher than the first valve open setpoint.

Example 6 is the header assembly of any or all previous examples wherein the controllably variable orifice is configured to receive the orifice control signal from a control system, based on an operator input, and to control a size of the variable orifice opening based on the orifice control signal.

Example 7 is the header assembly of any or all previous examples wherein the controllably variable orifice is configured to receive the orifice control signal from a control system, based on a direction of movement of the header, and to control a size of the variable orifice opening based on the orifice control signal.

Example 8 is the header assembly of any or all previous examples wherein the flow restricting orifice comprises:

a fixed orifice that has a fixed size orifice opening.

Example 9 is the header assembly of any or all previous examples and further comprising:

a first one-way check valve, disposed in parallel with the fixed orifice, that is configured to permit flow of the hydraulic fluid, through the first one-way check valve, from the float cylinder to the accumulator, when a pressure drop across the first one-way check valve reaches a first valve open set-point and to inhibit flow of the hydraulic fluid, through the first one-way check valve, from the accumulator to the float cylinder, when the pressure drop across the first one-way check valve drops below the first valve open set-point.

Example 10 is the header assembly of any or all previous examples and further comprising:

a second one-way check valve, disposed in parallel with the fixed orifice and the first one-way check valve, that is configured to permit flow of the hydraulic fluid, through the second one-way check valve, from the accumulator to the float cylinder, when a pressure drop across the second one-way check valve reaches a second valve open set-point and to inhibit flow of the hydraulic fluid, through the second one-way check valve, from the float cylinder to the accumulator, when the pressure drop across the second one-way check valve drops below the second valve open set-point.

Example 11 is the header assembly of any or all previous examples wherein the second one-way check valve is configured so the second valve open setpoint is higher than the first valve open setpoint Example 12 is a float force assembly for a harvesting machine header that is attached to a harvesting machine traction unit, the float force assembly comprising:

an accumulator that is fluidically coupled to a float cylinder through a fluid conduit defined by a tube and that provides pressurized fluid under pressure to the float cylinder through the fluid conduit, the float cylinder being coupled between the harvesting machine/traction unit and the harvesting machine header, so the float cylinder exerts a float force on the main frame; and a flow restricting orifice in the tube, between the float cylinder and the accumulator, that defines an orifice opening that is smaller than the fluid conduit on either side of the orifice.

Example 13 is the float force assembly of any or all previous examples wherein the flow restricting orifice comprises:

a controllably variable orifice that has a variable orifice opening.

Example 14 is the float force assembly of any or all previous examples and further comprising:

a first one-way check valve, disposed in parallel with the controllably variable orifice, that is configured to permit flow of the hydraulic fluid, through the first one-way check valve, from the float cylinder to the accumulator, when a pressure drop across the first one-way check valve reaches a first valve open set-point and to inhibit flow of the hydraulic fluid, through the first one-way check valve, from the accumulator to the float cylinder, when the pressure drop across the first one-way check valve drops below the first valve open set-point.

Example 15 is the float force assembly of any or all previous examples and further comprising:

a second one-way check valve, disposed in parallel with the controllably variable orifice and the first one-way check valve, that is configured to permit flow of the hydraulic fluid, through the second one-way check valve, from the accumulator to the float cylinder, when a pressure drop across the second one-way check valve reaches a second valve open set-point and to inhibit flow of the hydraulic fluid, through the second one-way check valve, from the float cylinder to the accumulator, when the pressure drop across the second one-way check valve drops below the second valve open set-point.

Example 16 is the float force assembly of any or all previous examples wherein the second one-way check valve is configured so the second valve open setpoint is higher than the first valve open setpoint.

Example 17 is the float force assembly of any or all previous examples wherein the flow restricting orifice comprises a fixed orifice that has a fixed size orifice opening and further comprising:

a first one-way check valve, disposed in parallel with the fixed orifice, that is configured to permit flow of the hydraulic fluid, through the first one-way check valve, from the float cylinder to the accumulator, when a pressure drop across the first one-way check valve reaches a first valve open set-point and to inhibit flow of the hydraulic fluid, through the first one-way check valve, from the accumulator to the float cylinder, when the pressure drop across the first one-way check valve drops below the first valve open set-point.

Example 18 is the float force assembly of any or all previous examples and further comprising:

a second one-way check valve, disposed in parallel with the fixed orifice and the first one-way check valve, that is configured to permit flow of the hydraulic fluid, through the second one-way check valve, from the accumulator to the float cylinder, when a pressure drop across the second one-way check valve reaches a second valve open set-point and to inhibit flow of the hydraulic fluid, through the second one-way check valve, from the float cylinder to the accumulator, when the pressure drop across the second one-way check valve drops below the second valve open set-point.

Example 19 is the float force assembly of any or all previous examples wherein the second one-way check valve is configured so the second valve open setpoint is higher than the first valve open setpoint Example 20 is a header supported by a traction unit of a harvesting machine, comprising:
a cutter;
a main frame that supports the cutter;
a float cylinder attached to the main frame and the traction unit;
an accumulator that is fluidically coupled to the float cylinder through a fluid conduit defined by a tube and that provides pressurized fluid under pressure to the float cylinder through the fluid conduit, so the float cylinder exerts a float force on the main frame; and
a flow restricting device that restricts flow in the tube, between the float cylinder and the accumulator, when the header is moving away from the ground in response to a force exerted on the header by impact with an obstacle and that avoids restricting flow in the tube. between the float cylinder and the accumulator, when the header is moving back toward the ground.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A header assembly for an agricultural harvesting machine having a traction unit, comprising:
   a cutter;
   a main frame that supports the cutter;
   a float cylinder configured to be coupled between the main frame and the traction unit;
   an accumulator that is fluidically coupled to the float cylinder through a fluid conduit defined by a tube and that provides pressurized fluid under pressure to the float cylinder through the fluid conduit, so the float cylinder exerts a float force on the main frame;
   a flow restricting orifice in the tube, between the float cylinder and the accumulator, that defines an orifice opening that is smaller than the fluid conduit on either side of the orifice; and
   a first one-way check valve, disposed in parallel with the flow restricting orifice, that is configured to permit flow of the hydraulic fluid, through the first one-way check valve, from the float cylinder to the accumulator, when a pressure drop across the first one-way check valve reaches a first valve open set-point and to inhibit flow of the hydraulic fluid, through the first one-way check valve, from the accumulator to the float cylinder, when the pressure drop across the first one-way check valve drops below the first valve open set-point; and
   a second one-way check valve, disposed in parallel with the flow restricting orifice and the first one-way check valve, that is configured to permit flow of the hydraulic fluid, through the second one-way check valve, from the accumulator to the float cylinder, when a pressure drop across the second one-way check valve reaches a second valve open set-point and to inhibit flow of the hydraulic fluid, through the second one-way check valve, from the float cylinder to the accumulator, when the pressure drop across the second one-way check valve drops below the second valve open set-point.

2. The header assembly of claim 1 wherein the flow restricting orifice comprises:
   a controllably variable orifice that has a variable orifice opening.

3. The header assembly or claim 2 wherein the controllably variable orifice is configured to receive an orifice control signal from a control system, based on an operator input, and to control a size of the variable orifice opening based on the orifice control signal.

4. The header assembly of claim 2 wherein the controllably variable orifice is configured to receive an orifice control signal from a control system, based on a direction of movement of the header, and to control a size of the variable orifice opening based on the orifice control signal.

5. The header assembly of claim 1 wherein the flow restricting orifice comprises:
   a fixed orifice that has it fixed size orifice opening.

6. The header assembly of claim 1 wherein the second one-way check valve is configured so the second valve open setpoint is higher than the first valve open setpoint.

7. A float force assembly for a harvesting machine header that is attached to a harvesting machine traction unit, the float force assembly comprising:
   an accumulator that is fluidically coupled to a float cylinder through a fluid conduit defined by a tube and that provides pressurized fluid under pressure to the float cylinder through the fluid conduit, the float cylinder being coupled between the harvesting machine traction runt and the harvesting machine header, so the float cylinder exerts a float force on the main frame; and
   a hydraulic circuit comprising:
      a flow restricting orifice in the tube that defines an orifice opening that is smaller than the fluid conduit on either side of the flow restricting orifice;
      a first one-way check valve, disposed in parallel with the flow restricting orifice, that is configured to permit flow of the hydraulic fluid, through the first one-way check valve, from the float cylinder to the accumulator, when a pressure drop across the first one-way check valve reaches a first valve open set-point and to inhibit flow of the hydraulic fluid, through the first one-way check valve, from the accumulator to the float cylinder, when the pressure drop across the first one-way cheek valve drops below the first valve open set-point; and
      a second one-way check valve, disposed in parallel with the flow restricting orifice and the first one-way check valve, that is configured to permit flow of the hydraulic fluid, through the second one-way check valve, from the accumulator to the float cylinder, when a pressure drop across the second one-way check valve reaches a second valve open set-point and to inhibit flow of the hydraulic fluid, through the second one-way check valve, from the float cylinder to the accumulator, when the pressure drop across the second one-way check valve drops below the second valve open set-point.

8. The float force assembly of claim 7 wherein the flow restricting orifice comprises:
   a controllably variable orifice that has a variable orifice opening.

9. The float force assembly of claim 7 wherein the second one-way check valve is configured so the second valve open setpoint is higher than the first valve open setpoint.

10. A header supported by a traction unit of a harvesting machine, comprising:
- a cutter;
- a main frame that supports the cutter;
- a float cylinder attached to the main frame and the traction unit;
- an accumulator that is fluidically coupled to the float cylinder through a fluid conduit defined by a tube and that provides pressurized fluid under pressure to the float cylinder through the fluid conduit, so the float cylinder exerts a float force on the main frame; and
- a flow restricting device that restricts flow in the tube, between the float cylinder and the accumulator, when the header is moving away from the ground in response to a force exerted on the header by impact with an obstacle and that avoids restricting flow in the tube, between the float cylinder and the accumulator, when the header is moving back toward the ground.

11. The header of claim 10 and further comprising:
- a one-way check valve, disposed in parallel with the flow restricting device, that is configured to permit flow of the hydraulic fluid, through the one-way check valve, from the float cylinder to the accumulator, when a pressure drop across the one-way check valve reaches a vale open set-point and to inhibit flow of the hydraulic fluid, through the one-way check valve, from the accumulator to the float cylinder, when the pressure drop across the one way check valve drops below the valve open set-point.

12. The header of claim 10 wherein the flow restricting device comprises a controllably variable orifice that has a variable orifice opening.

13. The header of claim 10 wherein the flow restricting device comprises a fixed orifice that has a fixed size orifice opening.

14. The header of claim 11 wherein the flow restricting device comprises a controllably variable orifice that has a variable orifice opening.

15. The header of claim 11 wherein the flow restricting device comprises a fixed orifice that has a fixed size orifice opening.

16. The header of claim 11 and further comprising:
- a second one-way check valve, disposed in parallel with the flow restricting device and the first one-way check valve, that is configured to permit flow of the hydraulic fluid, through the second one-way cheek valve, from the accumulator to the float cylinder, when a pressure drop across the second one-way check valve reaches a second valve open set-point and to inhibit flow of the hydraulic fluid, through the second one-way check valve, from the float cylinder to the accumulator, when the pressure drop across the second one-way check valve drops below the second valve open set-point.

17. The header of claim 16 wherein the second one-way check valve is configured so the second valve open setpoint is higher than the first valve open setpoint.

18. The header of claim 16 wherein the flow restricting devices comprises a fixed orifice that has a fixed size orifice opening.

19. The header of claim 16 wherein the flow restricting device comprises a controllably variable orifice that has a variable orifice opening.

20. The float force assembly of claim 7 wherein the flow restricting orifice comprises a fixed orifice that has a fixed size orifice opening.

* * * * *